(12) United States Patent
Yacoub et al.

(10) Patent No.: US 9,935,950 B2
(45) Date of Patent: Apr. 3, 2018

(54) SYSTEMS AND METHODS FOR ESTABLISHING OWNERSHIP AND DELEGATION OWNERSHIP OF IOT DEVICES USING DOMAIN NAME SYSTEM SERVICES

(71) Applicant: Verisign, Inc., Reston, VA (US)

(72) Inventors: Souheil Ben Yacoub, Jeuss (CH); Stephen Daniel James, South Riding, VA (US)

(73) Assignee: VERISIGN, INC., Reston, VA (US)

( * ) Notice: Subject to any disclaimer, the term of this patent is extended or adjusted under 35 U.S.C. 154(b) by 198 days.

(21) Appl. No.: 14/595,178

(22) Filed: Jan. 12, 2015

(65) Prior Publication Data
US 2016/0205097 A1 Jul. 14, 2016

(51) Int. Cl.
*G06F 15/16* (2006.01)
*H04L 29/06* (2006.01)
(Continued)

(52) U.S. Cl.
CPC ...... *H04L 63/0876* (2013.01); *H04L 61/1511* (2013.01); *H04L 61/3025* (2013.01);
(Continued)

(58) Field of Classification Search
USPC ............................................... 726/6; 713/171
See application file for complete search history.

(56) References Cited

U.S. PATENT DOCUMENTS 6,389,532 B1 * 5/2002 Gupta ................. H04L 63/0227
370/351
6,823,454 B1 * 11/2004 Hind ................. H04L 29/12066
713/168
(Continued)

FOREIGN PATENT DOCUMENTS

CN 103929435 A 7/2014
EP 2518970 A1 10/2012

OTHER PUBLICATIONS

Dr. Burt Kali ski : "Innovating with the 1-10 Domain Name System: From Web to Cloud to the Internet of Things", Sep. 2, 2014 (Sep. 2, 2014), pp. 1-26, XP055272616, Retrieved from the Internet: URL:http://www.whd.global/downloads/2014-a s i a/mFI 1 • pdf [retrieved on May 13, 2016], *pp. 6 "Domain Management", 12 "DNSSEC and DANE", 22 "Internet of Things" *.
(Continued)

*Primary Examiner* — Amare F Tabor
(74) *Attorney, Agent, or Firm* — Artegis Law Group, LLP

(57) ABSTRACT

Provided is a method for establishing ownership of a component of an internet of things ("IoT") device. The method comprises receiving, at a registration service, a request to register the component of the IoT device, the request comprising a public key of the component of the IoT device, an identifier of the component of the IoT device, and a public key of an owner of the component of the IoT device; determining a qualified name for the component of the IoT device based on a name associated with the owner of the component of the IoT device; generating one or more
(Continued)

domain name system ("DNS") records for the component of the IoT device, the one or more DNS records comprising an authentication file that identifies a chain of ownership of the component of the IoT device; and storing the one or more DNS records in a registry.

21 Claims, 7 Drawing Sheets

(51) Int. Cl.
*H04L 29/12* (2006.01)
*H04W 12/10* (2009.01)
*H04L 29/08* (2006.01)
*H04W 4/00* (2018.01)

(52) U.S. Cl.
CPC ............ *H04L 63/102* (2013.01); *H04L 67/12* (2013.01); *H04W 12/10* (2013.01); *H04L 61/305* (2013.01); *H04L 63/12* (2013.01); *H04W 4/005* (2013.01)

(56) References Cited

U.S. PATENT DOCUMENTS

| | | | | |
|---|---|---|---|---|
| 6,826,690 | B1* | 11/2004 | Hind | G06F 21/31 713/173 |
| 6,928,167 | B1* | 8/2005 | Maeda | H04L 29/12066 380/282 |
| 7,313,700 | B2* | 12/2007 | Delany | H04L 12/58 709/217 |
| 2007/0118750 | A1* | 5/2007 | Owen | H04L 63/126 713/176 |
| 2009/0070582 | A1* | 3/2009 | Aura | H04L 63/0823 713/168 |
| 2009/0198997 | A1* | 8/2009 | Yeap | H04L 63/0823 713/155 |
| 2012/0124369 | A1* | 5/2012 | Amenedo | H04L 63/0823 713/156 |
| 2014/0047322 | A1* | 2/2014 | Kim | G06F 17/2247 715/234 |
| 2016/0182459 | A1* | 6/2016 | Britt | H04L 63/0428 713/171 |

OTHER PUBLICATIONS

Extended European Search Report Application No. 16150917, dated May 24, 2016, 9 pages.
Dr. Burt Kali ski : "Innovating with the 1-10 Domain Name System: From Web to Cloud to the Internet of Things", Sep. 2, 2014 (Sep. 2, 2014), pp. 1-26, XP055272616, Retrieved from the Internet: URL:http://www.whd.global/downloads/2014-a s i a/mFI 1 • pdf [retrieved on May 13, 2016], *p. 6 "Domain Management", 12 "DNSSEC and DANE", 22 "Internet of Things" *.
Hoffman VPN Consortium J Schlyter Kirei AB 1-10 P: "The DNS-Based Authentication of Named Entities (DANE) Transport Layer Security (TLS) Protocol: TLSA; rfc6698.txt", The DNS-Based Authentication of Named Entities (DANE), TLS Protocol: TLSA; RFC6698.txt, IETF; ISOC 4, Rue Des Falaises CH- 1205 Geneva, Switzerland, Aug. 7, 2012 (Aug. 7, 2012), pp. 1-37, XP015086405, [retrieved on Aug. 7, 2012] * Sections (including sub-sections) 1.1, 2, 4, 8 *.
Tschofenig H et al: "A Datagram Transport 1-10 Layer Security (DTLS) 1.2 Profile for the Internet of Things; draft-ietf-dice-profile-06.txt", A A DTLS 1.2 Profile for the Internet of Things; Draft-IETF-Dice-Profile-06.Txt, IETF; StandardWorkingDraft, Internet Society (ISOC) 4, Rue Des Falaises CH-1205 Geneva, Switzerland, Dec. 8, 2014 (Dec. 8, 2014), pp. 1-35, XP015103466, [retrieved on Dec. 8, 2014] * sections 1, 3, 4, 6.3 *.

* cited by examiner

SYSTEMS AND METHODS FOR ESTABLISHING OWNERSHIP AND DELEGATION OWNERSHIP OF IOT DEVICES USING DOMAIN NAME SYSTEM SERVICES

BACKGROUND

The use of the Internet for purposes that extend beyond the current model of Web browsers interacting with Websites is growing rapidly. In particular, many devices are now being exposed on the Internet so as to enable interactions with those devices from devices and applications that are also connected to the Internet. As a result of this increasing usage of the Internet for interaction with connected devices, commonly called the Internet of Things (IOT), there is a growing demand for technology that enables these interactions to be performed securely in a way that protects the privacy of the data being exchanged in the interactions. The Internet has related to it standards, such as Domain Naming System (DNS) related standards, that can be leveraged in a number of ways to support data communications, device discovery and privacy protection. In addition to capabilities based on novel means of leveraging existing Internet-related standards, new capabilities can be defined that would extend those standards or provide capabilities that are not addressed by standards. The combination of these capabilities meets commonly found requirements for IOT security, privacy, communications, and data processing.

SUMMARY

In some aspects, a method for establishing ownership of a component of an internet of things ("IoT") device is disclosed. The method can comprise receiving, at a registration service, a request to register the component of the IoT device, the request comprising a public key of the component of the IoT device, an identifier of the component of the IoT device, and a public key of an owner of the component of the IoT device; determining a qualified name for the component of the IoT device based on a name associated with the owner of the component of the IoT device; generating one or more domain name system ("DNS") records for the component of the IoT device, the one or more DNS records comprising an authentication file that identifies a chain of ownership of the component of the IoT device; and storing the one or more DNS records in a registry.

The qualified name can be a domain name based on the name of the owner.

The one or more DNS records can comprise a DNS-Based Authentication of Named Entities ("DANE") record (TLSA or SMIMEA) and attribute record (TXT) that describes the attributes of the component of the IoT device.

The one or more DNS records can be utilized to verify the authenticity of messages signed by the component of the IoT device.

The method can further comprise receiving, at the registration service, a request to transfer ownership of the component of the IoT device, wherein the request includes the ID of the device that is to be transferred, the name and public key of a new owner of the component of the IoT device and wherein the request is signed with the private key of the current owner of the component of the IoT device. verifying the request with the public key of the current owner of the component of the IoT device; and updating the one or more DNS records to reflect the change in ownership of the owner to the new owner.

The updating the one or more DNS records can comprise updating the authentication file to associate the public key of the new owner with the component of the IoT device.

The method can further comprise determining a new qualified name for the component of the IoT device based on a name associated with the new owner of the component of the IoT device.

The method can further comprise creating of CNAME records in the DNS so as to redirect DNS lookups based on the name of a prior owner to the DNS entries for the new owner.

In some aspects, a non-transitory computer-readable storage medium containing instructions which, when executed on a processor, perform a method for establishing ownership of a component of an internet of things ("IoT") device. The method can comprise receiving, at a registration service, a request to register the component of the IoT device, the request comprising a public key of the component of the IoT device, an identifier of the component of the IoT device, and a public key of an owner of the component of the IoT device; determining a qualified name for the component of the IoT device based on a name associated with the owner of the component of the IoT device; generating one or more domain name system ("DNS") records for the component of the IoT device, the one or more DNS records comprising an authentication file that identifies a chain of ownership of the component of the IoT device; and storing the one or more DNS records in a registry.

In some aspects, a system is disclosed that can comprise one or more processors; and memory storing instructions that, when executed by the one or more processors, perform a method for establishing ownership of a component of an internet of things ("IoT") device. The method can comprise receiving, at a registration service, a request to register the component of the IoT device, the request comprising a public key of the component of the IoT device, an identifier of the component of the IoT device, and a public key of an owner of the component of the IoT device; determining a qualified name for the component of the IoT device based on a name associated with the owner of the component of the IoT device; generating one or more domain name system ("DNS") records for the component of the IoT device, the one or more DNS records comprising an authentication file that identifies a chain of ownership of the component of the IoT device; and storing the one or more DNS records in a registry.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

The Internet utilizes communication processes, such as Domain Naming System (DNS) related standards, that can be leveraged in a number of ways to support data communications, device discovery and privacy protection. Aspects of the present disclosure are related to an Internet of Things (IOT) service. According to aspects, the IOT service enables interactions between entities on the Internet and IOT capabilities, many of these incorporating new uses of DNS related processes. The IOT service includes a bundle of services that allow IOT devices to be registered, authenticated, and securely communicate with consuming entities and users. The IOT service utilizes DNS processes and services to register and authenticate the IOT devices. In addition to capabilities based on new techniques of leveraging existing Internet-related processes, new capabilities can be defined that would extend those standards or provide capabilities that are not addressed by standards. The combination of these capabilities meets commonly found requirements for IOT security, privacy, communications, and data processing.

Figure 1:
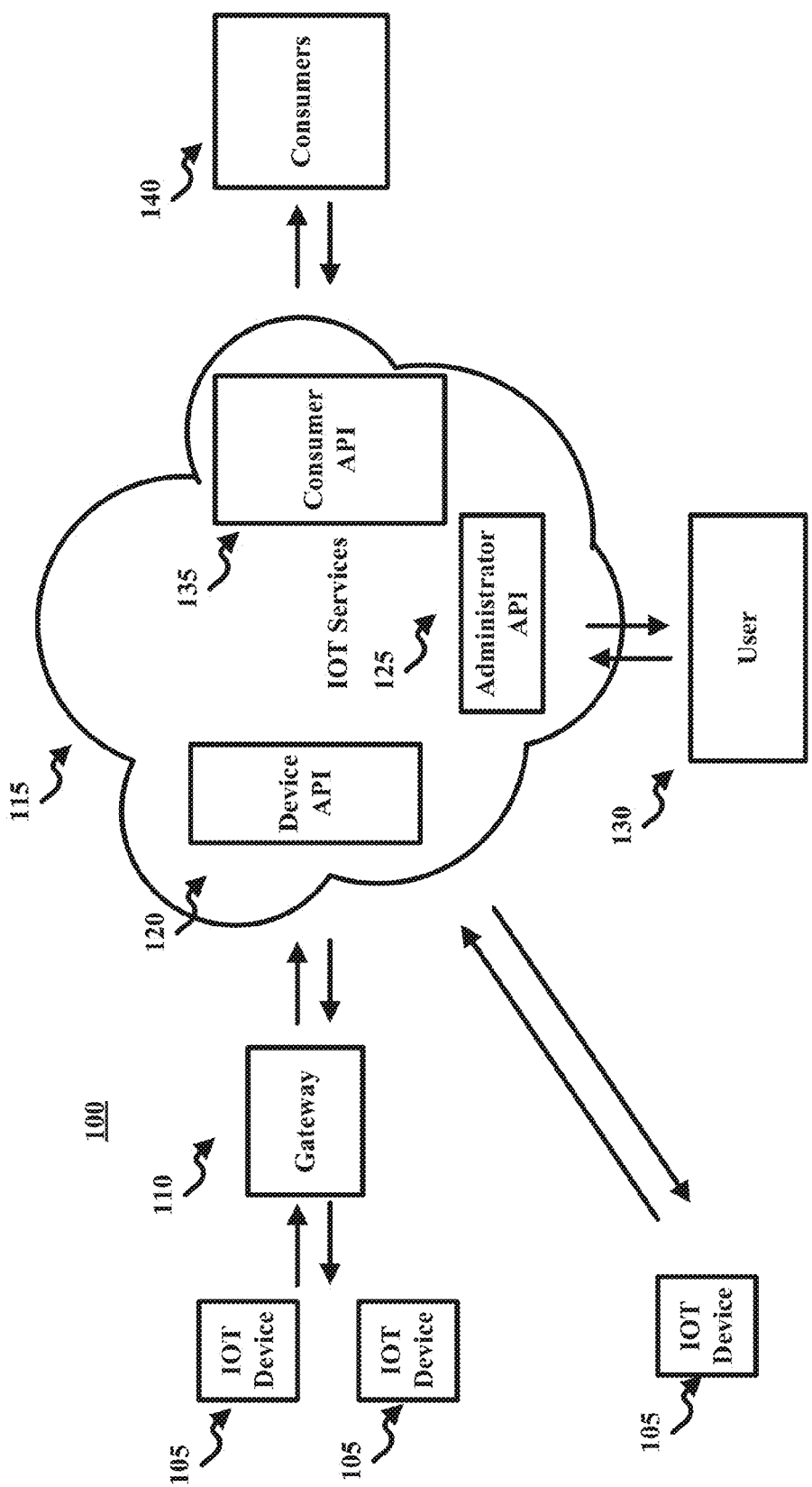
FIG. 1 illustrates an IOT environment including an IOT service, according to various aspects of the present disclosure.

FIG. 1 illustrates an IOT environment 100 including an IOT service 115, according to various aspects of the present disclosure. While FIG. 1 illustrates various components contained in the IOT environment 100, FIG. 1 illustrates one example of an IOT environment and additional components can be added and existing components can be removed.

As illustrated, the IOT environment 100 can include a number of IOT devices 105. The IOT devices 105 can be any type of electronic device that is capable of communicating with other electronic devices. For example, the IOT devices 105 can include a wide variety of devices such as conventional computing device, smart phones, appliances (e.g. washer/dryers that utilize network communications, smart thermostat systems, etc.), sensors (e.g. remote monitoring heart monitoring implants, biochip transponders, automobiles sensors, etc.), and the like.

In aspects, the IOT devices 105 can include the necessary hardware and software to directly communicate with an IOT service 115. In this example, the IOT devices can include the necessary hardware and software to communicate with the IOT service 115 using various protocols supported by the IOT service such as publish-subscribe messaging protocols, i.e., Message Queue Telemetry Transport ("MQTT"), and Domain Name System ("DNS") processes and services. Likewise, the IOT devices can be connected to an intermediary, such as a gateway 110. In this example, the gateway 110 can include the necessary hardware and software to communicate with the IOT devices 105 and the necessary hardware and software to communicate with the IOT service utilizing various protocols supported by the IOT service such as MQTT and DNS processes and services.

The Domain Name System ("DNS") is the part of the Internet infrastructure that translates human-readable domain names into the Internet Protocol ("IP") numbers needed to establish TCP/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (e.g., labels) separated by dots. The order of the labels represents a relationship between domain names within the DNS hierarchy. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "www.example.com". Domains can nest within the hierarchy for many levels. For example, each second-level domain can include a number of third-level domains located immediately to the left of the second-level domain, e.g. the "www" level in www.example.com. The labels in a domain name include one or more characters, each of which may either be an ASCII character or a language-specific character (e.g., Arabic, Chinese, Hindi, and Latin letters with diacritics (e.g., é)). Domain names represented, in whole or in part, by language-specific characters are called Internationalized Domain Names (IDNs). While not yet available, potential IDN versions of well-known TLDs, such as ".com," ".net," and ".org." could also be created (e.g. ".net").

The responsibility for operating each TLD, including maintaining a registry of the second-level domains within the TLD, is delegated using a hierarchy of DNS services with different entities acting as the "registry" or "authoritative" registry for a portion of the hierarchy to a particular organization, known as a domain name registry ("registry"). The registry is primarily responsible for answering queries for IP addresses associated with domains ("resolving"), typically through DNS servers that maintain such information in large databases, and for operating its top-level domain.

For most TLDs, in order for end-users to obtain a domain name, that domain name has to be registered with a registry through a domain name registrar, an entity authorized to register Internet domain names on behalf of end-users. Alternatively, an end-user can register a domain name indirectly through one or more layers of resellers. A registry may receive registrations from hundreds of registrars.

A zone file is a text file that describes a portion of the DNS called a DNS zone. A zone file is organized in the form of resource records (RR) and contains information that defines mappings between domain names and IP addresses and other resources. The format of zone files is defined by a standard, with each line typically defining a single resource record. A line begins with a domain name, but if left blank, defaults to the previously defined domain name. Following the domain name is the time to live (TTL), the class (which is almost always "IN" for "internet" and rarely included), the type of resource record (A, MX, SOA, etc.), followed by type-specific data, such as the IPv4 address for A records. Comments can be included by using a semi-colon and lines can be continued by using parentheses. There are also file directives that are marked with a keyword starting with a dollar sign.

The DNS distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism generally helps avoid the need for a single central registry to be continually consulted and updated. The DNS resolution process allows for users to be directed to a desired domain by a lookup process whereby the user enters the desired domain, and the DNS returns appropriate IP numbers. During the DNS resolution process, a request for a given domain name is routed from a resolver (e.g., a stub resolver) to an appropriate server (e.g., a recursive resolver) to retrieve the IP address. To improve efficiency, reduce DNS traffic across the Internet, and increase performance in end-user applications, the DNS supports DNS cache servers that store DNS query results for a period of time determined by the time-to-live (TTL) of the domain name record in question. Typically, such caching DNS servers, also called DNS caches, also implement the recursive algorithm necessary to resolve a given name starting with the DNS root through to the authoritative name servers of the queried domain. Internet service providers (ISPs) typically provide recursive and caching DNS servers for their customers. In addition, home networking routers may implement DNS caches and proxies to improve efficiency in the local network.

According to aspects of the present disclosure, the IOT service 115 can assign a domain name to each of the IOT devices 105. The domain name can then be associated with the IP address of the IOT device 105. Domain names, i.e., qnames, can also be assigned by an entity owner of the IoT device 105. To facilitate the registration of IOT devices, an IOT service can provide an application programming interface (API) that performs DNS registration of IOT devices on behalf of devices and gateways (DNS API not shown). The IOT service 115 can provide a domain name that uniquely identifies the devices as IOT devices and also shows the relationship of the devices. For example, the IOT service 115 can establish a domain for IOT devices such as ".iotservice.com." As the devices are registered with the IOT service 115, the IOT service assigns the domain name and creates the DNS records for the IOT devices. For example, if the IOT devices 105 are owned by "Company A," the IOT service can create a domain "companyA.iotservice.com." The IOT service 115 can assign a unique domain name to each of the IOT devices, for example, "iotdevice1.companyA.iotservice.com." The domain and the domain names for each of the IOT devices allow consumers 140 to locate and communicate with the IOT devices 105.

The IOT service 115 can also include an API 125 to allow a user 130 to communicate with the IOT service 115. The user 130 can communicate with the IOT service to establish the services of the IOT service 115, register devices 105, and the like. The IOT service 115 can also include an API 135 to allow the consumers 140 to locate and communicate with the IOT devices 105. In some aspects, one or more services provided by the IOT service 115 can reside in the cloud.

Figure 2:
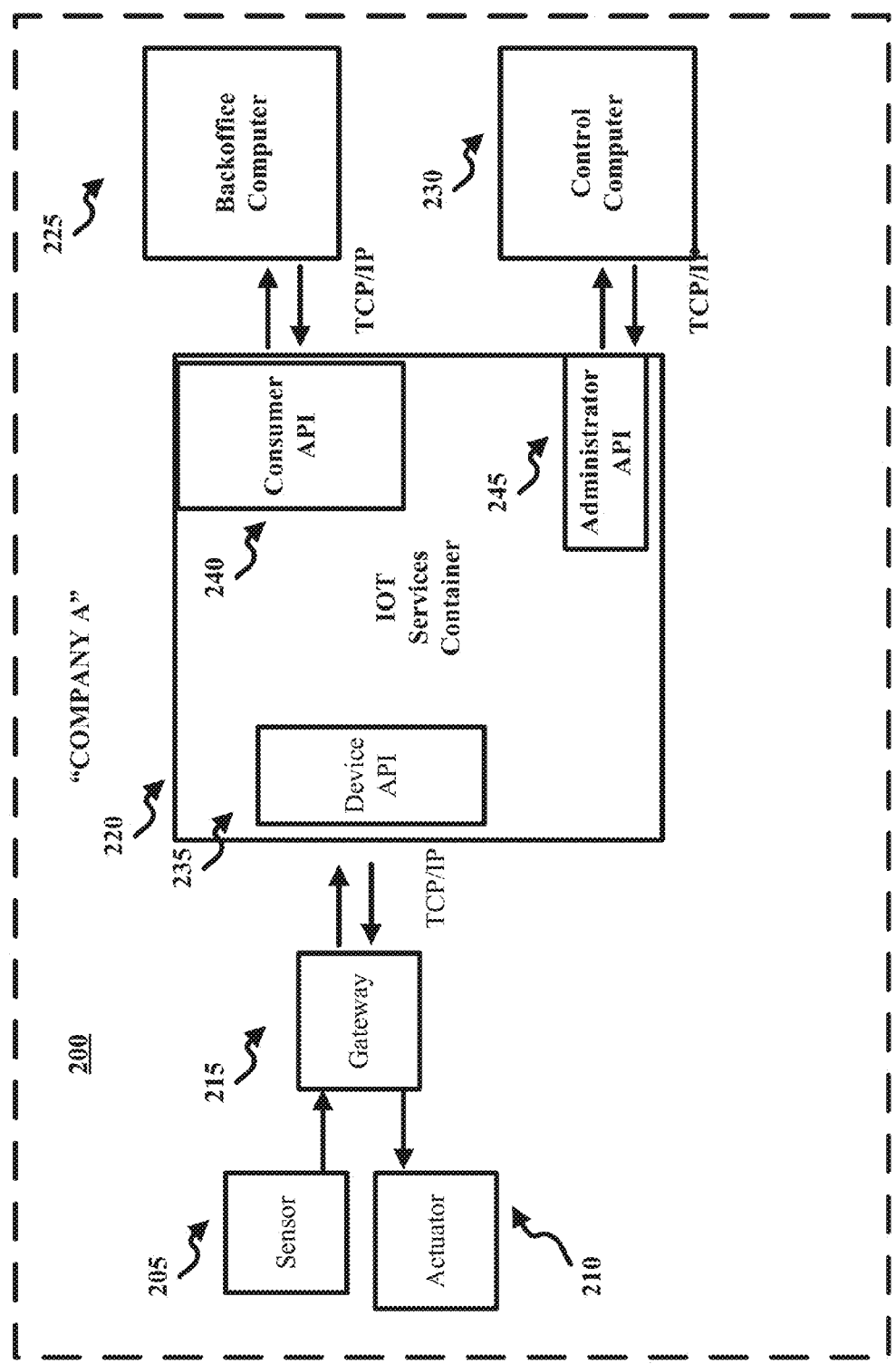
FIG. 2 shows an example internal organization environment (denoted by "Company A") having one or more IoT devices that can utilize an IOT service, according to various implementations.

FIG. 2 shows an example internal organization environment 200 (denoted by "Company A") having one or more IoT devices that can utilize an IOT service, according to various implementations. As illustrated in FIG. 2, the internal organization environment can include a first IoT device, shown as sensor 205, and a second IoT device, shown as actuator 210, which are in communication with a gateway device 215. The IoT devices can be utilized by Company A in daily operations. For example, the sensor 205 can monitor the temperature of a piece of manufacturing equipment and the actuator 210 can be a component of the manufacturing equipment, e.g. cooling fan. Company A can desire to monitor and utilize the IoT devices using a IoT service.

In this example, the IoT service can be implemented as an IoT services container. An IoT services container provides one or more services to an IoT device via one or more APIs. The one or more services can include, but are not limited to, an administrative service, a datameeter service (a data service that can take one or more data feeds and perform operations on the data including, but not limited to, modifying, averaging, aggregating, transforming, etc., as describe herein), a crawler service, a messaging service, a DNS service. The IoT services container 220 is arranged between the gateway device 215 and a back office computer 225 and a control computer 230. In some example, the IoT services container can be included in the gateway device 215. The IoT services container can be hosted by Company A or can be hosted by a separate entity or organization.

In this example, the sensor 205, such as a temperature sensor, can detect the temperature of a particular area of Company A and send temperature readings, either continuously or periodically, to the gateway device 215 through a data feed. The gateway device 215 can communicate with the IoT services container 220, through a device API 235 over a communications protocol, i.e., TCP/IP, to provide the data feed to subscribers/consumers thereof. The back office computer 225, through a consume API 240 of the IoT services container 220 over a communications protocol, i.e., TCP/IP, may be operable to perform various functions, including, but are not limited, administrative, record keeping, etc. The control computer 230, through an administrator API 245 of the Iot services container 220 over a communication protocol, i.e., TCP/IP, may be operable to monitor the temperature from the sensor 205 and determine that a particular action is warranted based its readings. In this example, if the control computer 230 determines that the temperature monitored by the sensor 205 is too high, the control computer 230 can send a signal through the IoT services container 220 to the actuator 210 to lower the temperature by turning on a fan for a given time period.

According to aspects of the present disclosure, the IOT service 115 can utilize DNS process and services, such as DNS-based Authentication of Named Entities (DANE) and DNSSEC to register and authenticate IOT devices, this enabling authentication of data received from IOT devices and also supporting encryption of data sent by IOT devices. DANE provides a mechanism for associating the public key or a certificate containing a public key with an IOT device that can be identified by means of a unique domain name associated with a device. This association of a device with its public key or certificate containing a public key is stored in DNS registry records, either TLSA or SMIMEA, that are identified by the unique domain name associated with a device.

The need for IoT device authentication becomes more apparent as more and more IoT devices are attached to the Internet. As a result, it becomes less and less likely that there will be direct communication between the IoT devices and the applications that will be used to monitor and control them. The current model for authentication is based on verifying the endpoints of the communication where typically the client verifies the X.509 certificate provided by the server against the local trust store, and the server verifies the client based on a credential. The credential provided by the client is typically a username/password combination, an API key, or an X.509 client certificate. When interaction between the IoT device and the application is separated by messaging middleware, such as a message bus of a middleware container, the current model requires placing trust in the message bus. The IoT device authenticates with the message bus and the application authenticates with the message bus. However, since there is no direct communication between the IoT device and the application, the IoT device never authenticates with the application and the application never authenticates with the IoT device. It is also possible that many, untrusted entities may exist between the IoT device and the application. For instance, due to unreliable or intermittent communication, it may be desirable to introduce multiple gateways and/or multiple containers, each of which are capable of storing a message until network conditions are such that the message can be forwarded along the path towards the destination.

As a consequence, two entities, i.e., the IoT device and the application (or another IoT device or a container), would benefit by a mechanism of validating that the information they receive came from the expected source and was not modified in transit, even when the information passed through one or more untrusted intermediaries. The approach to validating the information sources in these scenarios taught in the invention described here-in is based on creating a binding between a name and a public key in a globally accessible registry. This validation mechanism can be arranged such that one entity, i.e., the IoT device, first generates a private and public key pair. The private key is stored locally within an electronic memory of the IoT device. The name of the IoT device and the public key is sent to a globally accessible registry, i.e., a DNS registry, where it is stored. When the IoT device has information to send, the IoT device generates a payload in an application specific way. A cryptographic signature is computed over the name of the IoT device and the payload. The resulting message is the combination of the name of the IoT device, the payload, and the cryptographic signature.

The message is then forwarded towards the recipient, i.e., an application, another IoT device, or a container. When received by the recipient, the name of the IoT device, the payload, and the signature are extracted from the message. The public key of the IoT device is retrieved from the globally accessible registry using the name of the IoT device as the key. The public key is used by the recipient to verify the source of the message and that the message has not been modified in transit. Every entity has a private/public key pair. The private key is used by the entity for signing and encrypting data, and the public key is used by entities wishing to verify the authenticity of signed data received from a entity and/or to decrypt encrypted data received from an entity.

DANE can be used for authentication and privacy for entities registered into the DNS as described above, i.e., IoT devices, containers, and applications. DANE provides a standards-based mechanism for storing and retrieving the public keys used in authentication and encryption mechanisms. The public key for registered entities is available from DNS by querying the DNS for the DANE defined record corresponding to the entity. The record to be retrieved is identified in the query using a derivation of the domain name (qname) as the search value. A retrieved record containing the public key for an entity is the one created by the IOT registration process. These records will be of a type defined by the DANE protocol, either TLSA or SMIMEA. Messages (data) that are digitally signed with the corresponding private key of the IoT device can be authenticated using the public key that is registered in DNS.

The integrity of the authentication and encryption processes described herein relies on trusting that only the entity to which a private key applies will use that private key to sign messages or for encrypting communications (messages) generated by the entity. Entities are expected to keep the private key in secure storage in which only the entity has access. An entity can use the private and public keys as part of a communication using a secure transport, TLS/DTLS. This present disclosure also applies to messages originated from an entity and which have been signed by the entity as a means of assuring the authenticity of such messages. Additionally, a device could encrypt messages using the private key of the device so as to protect the privacy of the data contained in the messages.

Entities communicate with each other via IOT message services. One example of such a service is a publish/subscribe messaging infrastructure on which a feed-based messaging protocol is based. In this example, an entity can publish messages to a specific feed based on a feed identifier (feed ID) that is unique within the messaging service. Entities subscribed to a feed identified by that feed identifier will receive messages published to the feed. The message data published to feeds can be described with a shared ontology that standardizes the terms used for the data elements contained in messages, i.e., temperature, speed, etc. Message flows are typically one-way. Two-way messaging uses two one-way flows i.e. for two entities to communicate, each would subscribe to a feed that the other publishes messages to. Entities can be broadly characterized as IoT devices, applications, services, and containers (IoT service containers), and can be grouped into a variety of arrangements including, but not limited to the following: a device (such as a thermometer) that publishes data (such as temperature) to a feed, which then provides that data to an entity interested in using that data (a web app that displays current temperature); an entity (a light bulb) that can be controlled via messages it receives from a feed it subscribes to which a controlling entity (Web app) publishes control messages (toggle light bulb on and off).

IoT devices can include one or more subcomponents that can be manufactured by different entities and sold or managed by still another entity. For example, a first entity (hereinafter, denoted "company A") may produce a computer processor. A second entity (hereinafter, denoted "company B") may produce a device that contains the computer processor produced by company A. A third entity (hereinafter, denoted "company C") may sell or manage the device produced by company B and including the computer processor produced by company A. An end-user or another entity may wish to verify the authenticity of the various components or services offered by the device. According to some aspects of the present disclosure, DNS using DANE can be used to address these concerns.

Figure 3A:
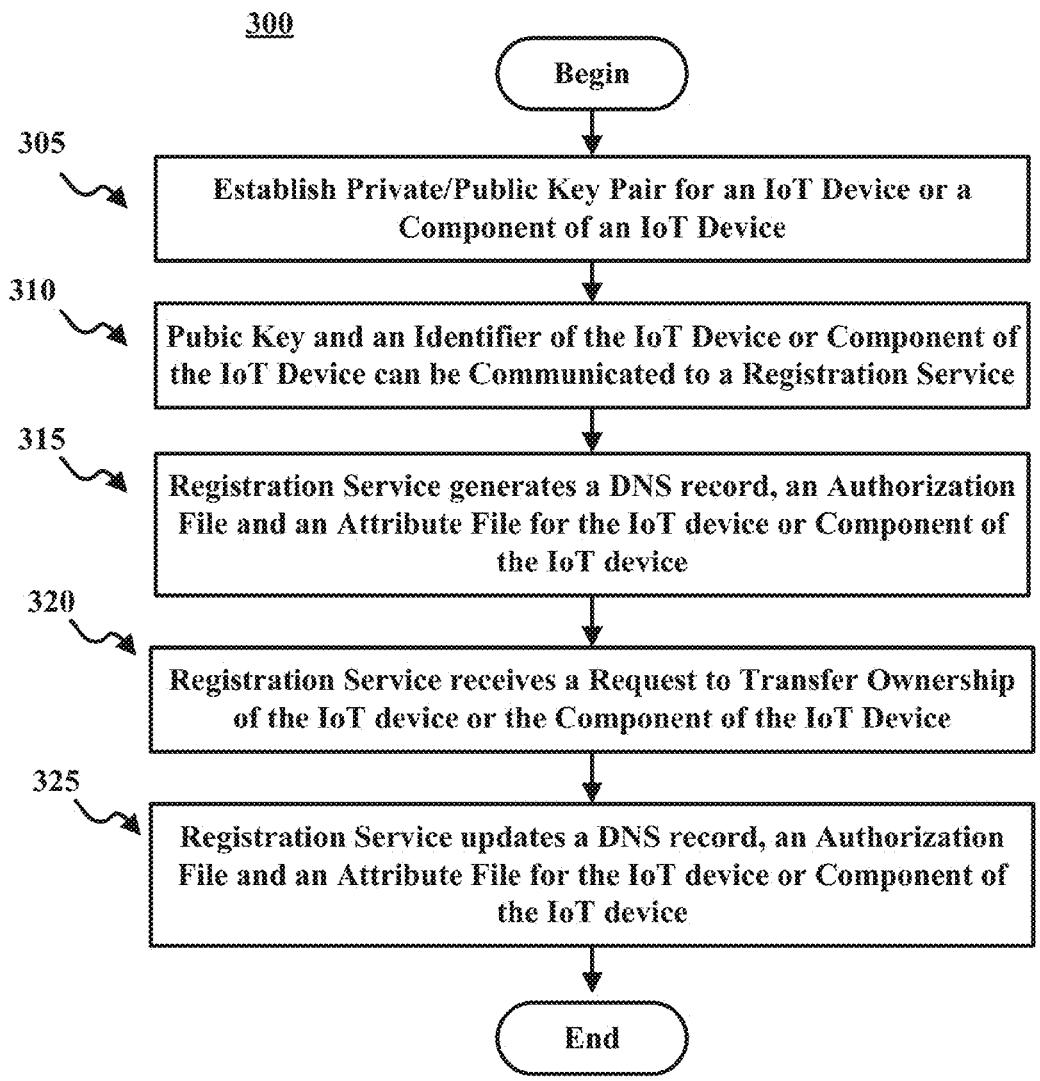
FIGS. 3A and 3B show an example process for registration of public keys for three entities, according to the present disclosure, according to the present disclosure.
Figure 3B:
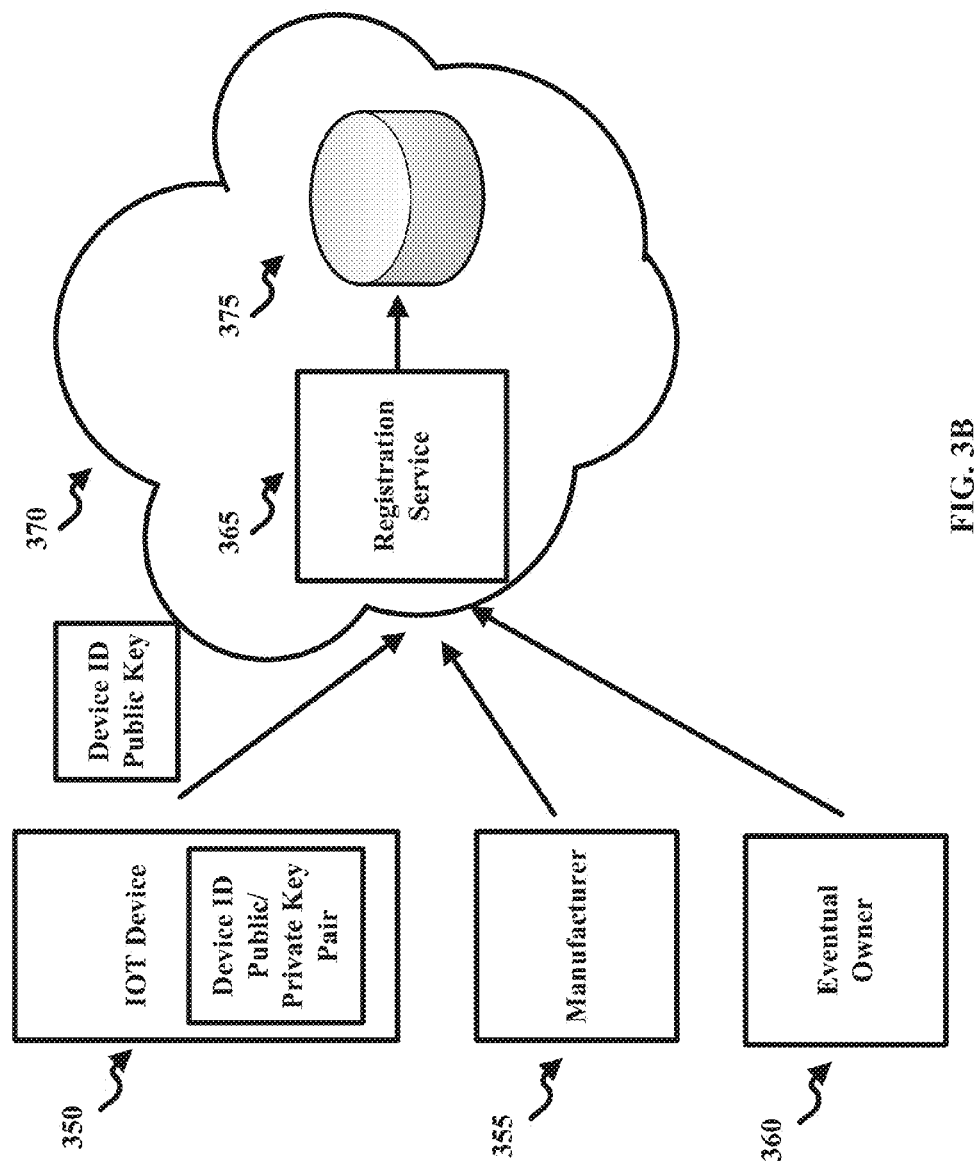

FIGS. 3A and 3B shows an example process for registration of public keys for three entities, according to the present disclosure. In the process 300, the illustrated stages are examples and any of the illustrated stages can be removed, additional stages can be added, and the order of the illustrated stages can be changed.

After the process begins, in 305, a public/private key pair can be established for an IoT device or for a component of an IoT device. For example, as illustrated in FIG. 3B, a first entity 350, i.e., IoT device or component of an IoT device, and include a public/private key pair and a device identifier. A second entity 355 can be an IoT device manufacturer and a third entity 360 can be the eventual owner of the IoT device. The public/private key pair can be generated by the IoT device or can be generated another entity, for example, the second entity 355 or the third entity 360, and the private key pushed to the IoT device.

In 310, the pubic key and an identifier of the IoT device or component of the IoT device can be communicated to a registration service 365, in an IoT service 370. The registration service can be operable to transform the public key to a qname (qualified name), i.e, a domain name. A DNS registry 375 can communicate with the registration service 365 to create a TLSA or SMMEA record in a zone file for the qname and public key to be stored. The second entity 355 and/or the third entity 360 can also communicate with the registration service 365.

In 315, the registration service generates a DNS record, an authorization file and an attribute file for the IoT device or component of the IoT device. The DNS record can include a TLSA or SMMEA record in a zone file for the qname and public key to be stored. The attribute file contains relevant information that describes the IoT device or the component of the IoT device, for example, model, firmware, date of creation, etc. The authorization file contains information on rights and ownership of the IoT device of component of the IoT device. For example, if the second entity 365 manufactures the first entity 350, the authorization file can include information that identifies the second entity 365 as the owner and the rights the second entity 365 has relative to the first entity 350.

In 320, the registration service can receive a request to transfer ownership of the IoT device or the component of the IoT device. For example, as illustrated in FIG. 3B, the second entity 355 can transfer ownership to the third entity 360.

In 325, the registration service can update the DNS record, an authorization file and an attribute file for the IoT device or component of the IoT device. For example, the registration service 365 can update the DNS record, an authorization file and an attribute file to reflect that the first entity 350 has been transferred to the third entity 360 from the second entity 355.

Figure 4A:
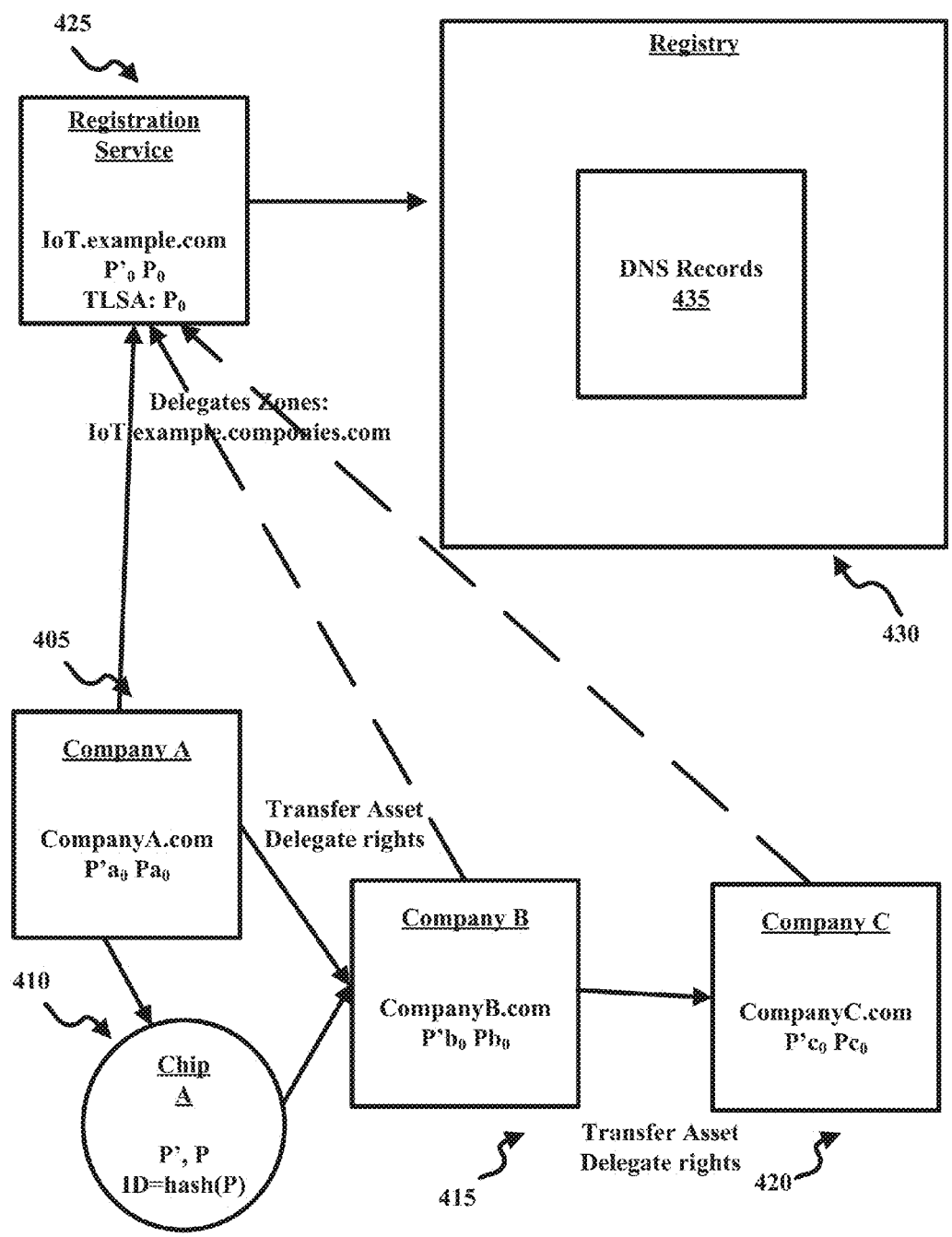
FIGS. 4A and 4B show an example process whereby DNS registry manages: the delegated zones: iot.companies.com; updates TLSA entries; hosts the <<authorization>>/ <<attribute>>files: runs/provides DANE libraries for involved parties, according to the present disclosure.
Figure 4B:
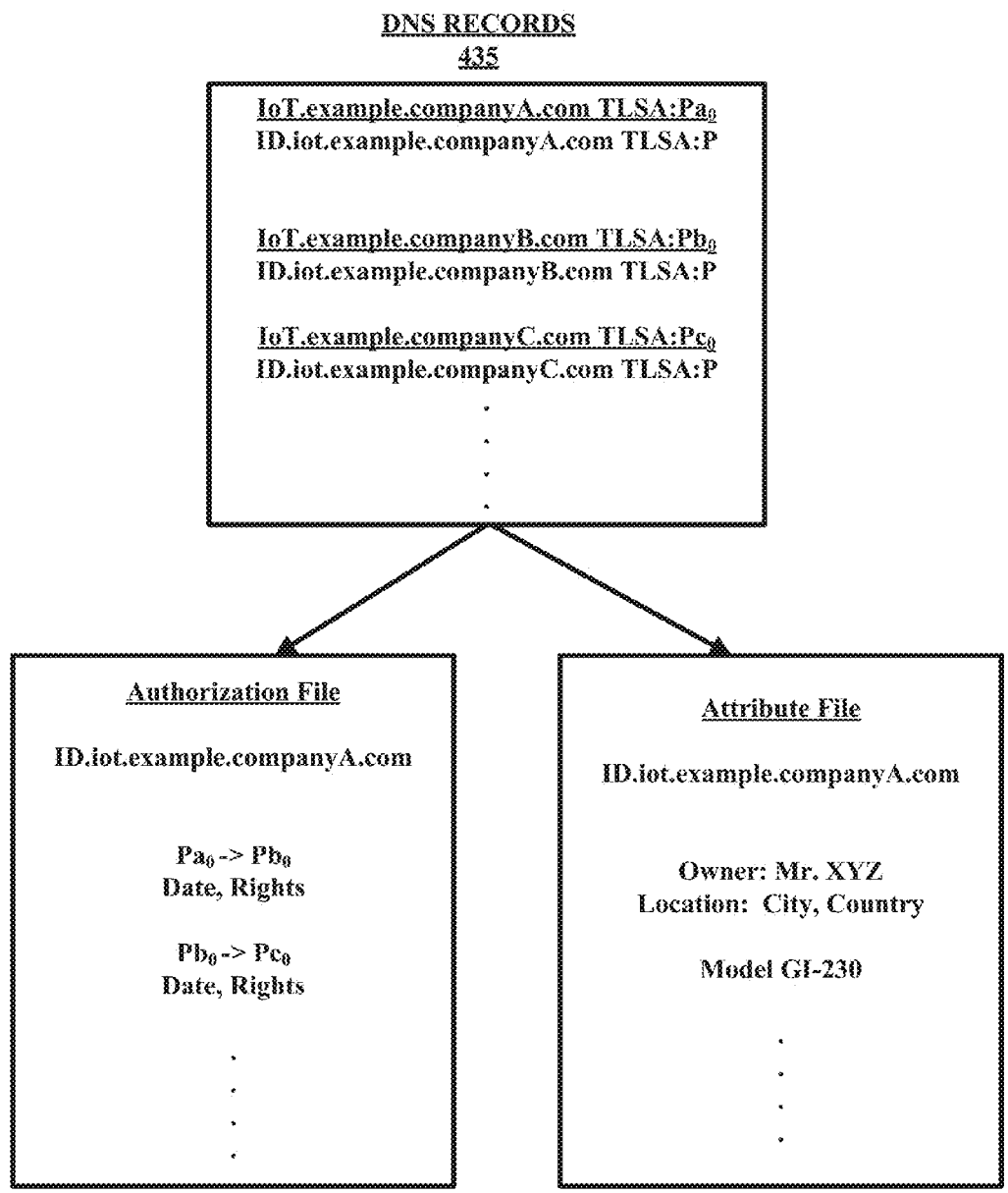

FIGS. 4A and 4B show an example process of the registration and management of ownership of a computer chip 410 manufactured by Company "A" 405, according to the present disclosure. In this example, a registration service 425 can communicate with a registry 430 to create and manage: the delegated zones: iot.example.companies.com; updates TLSA entries; hosts the Authorization/Attribute files; runs/provides DANE libraries for involved parties. While the registration service 425 and registry 430 are illustrated as separate entities, the registration service 425 and the registry 430 can be implemented in the same entity.

In this example, the Company A 405 has $Pa'_0, Pa_0$ as private/public key pair and produces a computer chip 410 with private/public keys (P',P). The computer chip 410 can store an identifier ID=hash (P). Company A asks the registry to create an entry ID.iot.example.companyA.com associated with the chip 410. The entry comprises an attribute file and an authorization file. The attribute file contains information relevant to the chip (model, firmware, date of creation etc. . . . ). The authorization file contains information on rights and ownership of the chip 410. Company B 415 has $Pb'_0, Pb_0$ as private/public key pair and produces IoT devices using computer chip 410 from company A 405. Company C 420 has $Pc'_0, Pc_0$ as private/public key pair and service provider using IoT device from company B 415.

In this example, company A 405 transfers asset delegate rights to company B 415 and company B 415 transfers asset delegate rights to company C 420. Company A 405, B 415 and C 420 delegates to a DNS registry 425 the zone: iot.example.companyA.com; iot.example.companyB.com; and iot.example.companyC.com. The DNS registry 425 can insert the following into the zone file: $Pa_0$ in TLSA of iot.example.companyA.com, $Pb_0$ in TLSA of iot.example.companyB.com, $Pc_0$ in TLSA of iot.example.companyC.com.

The DNS registry 425 can register the following: ID.iot.example companyA.com, update TLSA with P, adds Authorization file with entry: P→Pa0. ID.iot.example.company.A.com resolves to the Authorization file. The DNS registry 425 can then sign the file. Thus, any party can check the public key P of the computer chip 410, validate signed messages from the computer chip 410, and know that computer chip 410 is from company A 405.

Company A 405 can delegate ownership of computer chip 410 to Company B 415 by sending a signed message to the DNS registry 425 with the following content: Date; ID.iot.example.companyA.com; $Pa_0 \rightarrow Pb_0$. The DNS registry 425 can then check the validity of message and update Authorization file accordingly and signs it. The DNS registry 425 creates a DANE record (TLSA or SMIMA) that indicates ownership of chip 410 with the following content: ID.iot.example.companyB.com with P as the public key referenced in the record. A change name ("CNAME") record is then created in the DNS for Company A so that lookups for P in the DNS for company A will be redirected to the DANE record for P registered in DNS for Company B. The CNAME record has the following content: ID.iot.example.companyA.com, CNAME=ID.iot.example.companyB.com.

Company B 415 can delegate ownership of computer chip 410 to company C 420 by sending a signed message to the DNS registry 425 with the following content: ID.iot.example.companyB.com; $Pb_0 \rightarrow Pc_0$. The DNS registry 425 can then check the validity of the message and update Authorization file accordingly and signs it. The DNS registry 425 creates a DANE record (TLSA or SMIMEA) that indicates ownership of chip 410 with the following entry: ID.iot.example.companyC.com with P as the public key referenced in the record. A CNAME record is then created in the DNS for Company B so that lookups for P in the DNS for company B will be redirected to the DANE record for P registered in DNS for Company C. The CNAME record has the following content: ID.iot.example.companyB.com, CNAME=ID.iot.example.companyC.com. Thus, anyone can verify the authenticity of message signed by computer chip 410 produced by company A 405, IoT device produced by company B, and service provider from company C 420. Thus, anyone can verify delegation according to Authorization file hosted by the DNS registry 425. Optionally, a signed Attribute file linked to ID.iot.example.companyA.com can be added.

The DNS registry 425 can have the following record 420: iot.example.companyA.com TLSA:$Pa_0$, ID.iot.example.companyA.com TLSA:P, iot.example.companyB.com TLSA:$Pb_0$, ID.iot.example.companyB.com TLSA:P, iot.example.companyC.com TLSA:$Pc_0$, ID.iot.example.companyC.com TLSA:P. An Authorization file can include the following: ID.com.example.companyA.com; $Pa_0 \rightarrow Pb_0$, Date; rights; $Pb_0 \rightarrow Pc_0$; date, rights. An Attribute file can include relevant information regarding the chip 410 like model or date of production. As example the following information could be added: ID.iot.example.company A.com; owner: Mr. XYX; location: city, country; model: GI-230.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor (e.g., processor 302), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Figure 5:
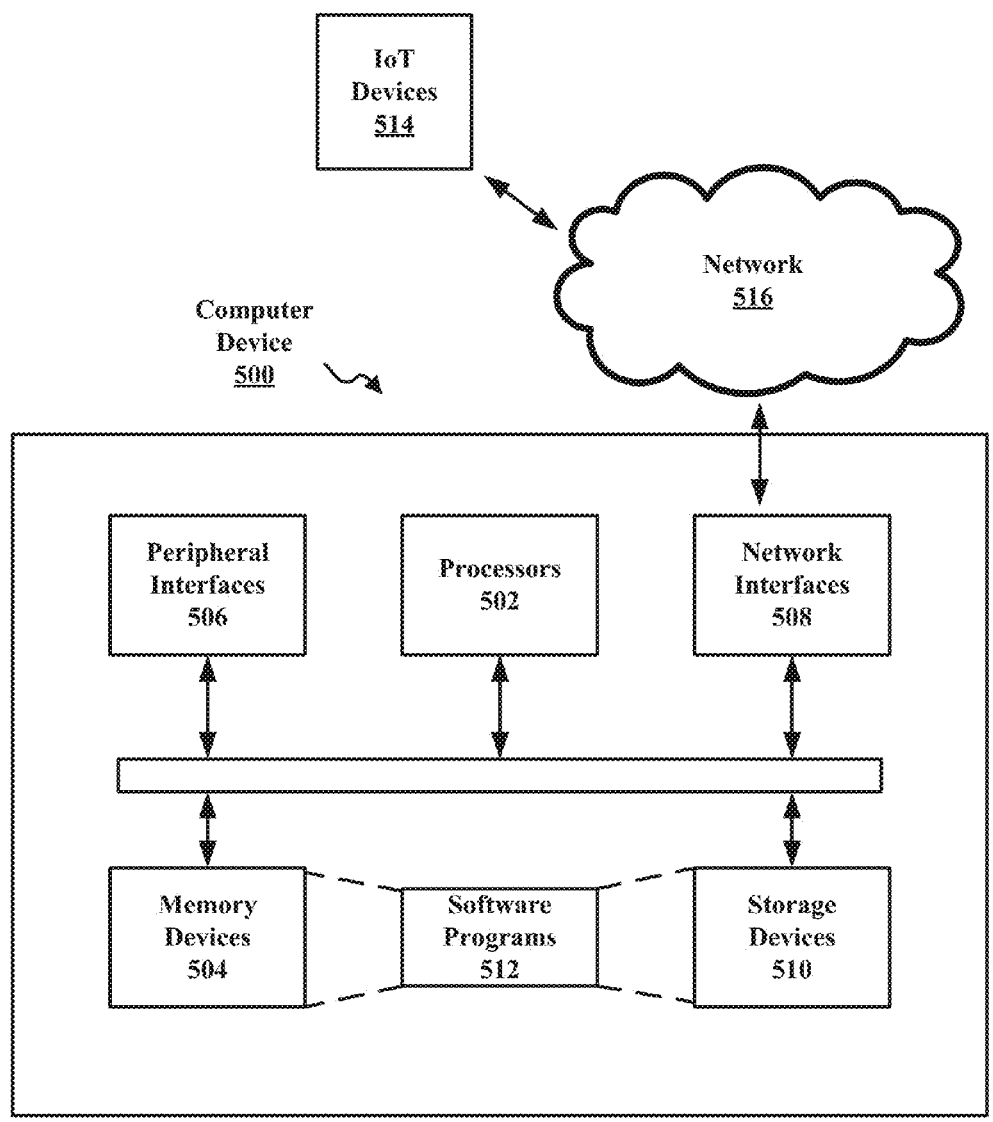
FIG. 5 illustrates an example of a hardware configuration for a computer device.

For example, FIG. 5 illustrates an example of a hardware configuration for a computer device 500, that can be used to perform one or more of the processes of the IoT service described above. While FIG. 5 illustrates various components contained in the computer device 500, FIG. 5 illustrates one example of a computer device and additional components can be added and existing components can be removed.

The computer device 500 can be any type of computer devices, such as desktops, laptops, servers, etc., or mobile devices, such as smart telephones, tablet computers, cellular telephones, personal digital assistants, etc. As illustrated in FIG. 5, the computer device 500 can include one or more processors 502 of varying core configurations and clock frequencies. The computer device 500 can also include one or more memory devices 504 that serve as a main memory during the operation of the computer device 500. For example, during operation, a copy of the software that supports the IoT service can be stored in the one or more memory devices 504. The computer device 500 can also include one or more peripheral interfaces 506, such as keyboards, mice, touchpads, computer screens, touchscreens, etc., for enabling human interaction with and manipulation of the computer device 500.

The computer device 500 can also include one or more network interfaces 508 for communicating via one or more networks, such as Ethernet adapters, wireless transceivers, or serial network components, for communicating over wired or wireless media using protocols. The computer device 500 can also include one or more storage device 510 of varying physical dimensions and storage capacities, such as flash drives, hard drives, random access memory, etc., for storing data, such as images, files, and program instructions for execution by the one or more processors 502.

Additionally, the computer device 500 can include one or more software programs 512 that enable the functionality of the IoT service described above. The one or more software programs 512 can include instructions that cause the one or more processors 502 to perform the processes described herein. Copies of the one or more software programs 512 can be stored in the one or more memory devices 504 and/or on in the one or more storage devices 510. Likewise, the data, for example, DNS records, utilized by one or more software programs 512 can be stored in the one or more memory devices 504 and/or on in the one or more storage devices 510.

In implementations, the computer device 500 can communicate with one or more IoT devices 514 via a network 516. The one or more IoT devices 514 can be any types of devices as described above. The network 516 can be any type of network, such as a local area network, a wide-area network, a virtual private network, the Internet, an intranet, an extranet, a public switched telephone network, an infrared network, a wireless network, and any combination thereof. The network 516 can support communications using any of a variety of commercially-available protocols, such as TCP/IP, UDP, OSI, FTP, UPnP, NFS, CIFS, AppleTalk, and the like. The network 516 can be, for example, a local area network, a wide-area network, a virtual private network, the Internet, an intranet, an extranet, a public switched telephone network, an infrared network, a wireless network, and any combination thereof.

The computer device 500 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 500 as described above need not be enclosed within a single enclosure or even located in close proximity to one another. Those skilled in the art will appreciate that the above-described componentry are examples only, as the computer device 500 can include any type of hardware componentry, including any necessary accompanying firmware or software, for performing the disclosed implementations. The computer device 500 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A method for establishing ownership of a component of an internet of things ("IoT") device, the method comprising:
    receiving, at a registration service, a request to register the component of the IoT device, the request comprising a public key of the component of the IoT device, an identifier of the component of the IoT device, and a public key of an owner of the component of the IoT device;
    generating, via the registration service, an authorization file that includes rights information associated with the component of the IoT device;
    determining a qualified name for the component of the IoT device based on a name associated with the owner of the component of the IoT device;
    generating one or more domain name system ("DNS") records for the component of the IoT device, the one or more DNS records comprising the authorization file and an authentication file that identifies a chain of ownership of the component of the IoT device; and
    storing the one or more DNS records in a registry.

2. The method of claim 1, wherein the qualified name is a domain name based on the name of the owner.

3. The method of claim 1, wherein the one or more DNS records comprises a DNS-Based Authentication of Named Entities ("DANE") record and attribute record (TXT) that describes the attributes of the component of the IoT device, wherein the DNS-Based DANE record comprises a TLSA record or SMIMEA record.

4. The method of claim 1, wherein the one or more DNS records can be utilized to verify the authenticity of messages signed by the component of the IoT device.

5. The method of claim 1, the method further comprising:
    receiving, at the registration service, a request to transfer ownership of the component of the IoT device, wherein the request includes the ID of the device that is to be transferred, the name and public key of a new owner of the component of the IoT device and wherein the request is signed with the private key of the current owner of the component of the IoT device;
    verifying the request with the public key of the current owner of the component of the IoT device; and
    updating the one or more DNS records to reflect the change in ownership of the owner to the new owner.

6. The method of claim 5, wherein updating the one or more DNS records comprises updating the authentication file to associate the public key of the new owner with the component of the IoT device.

7. The method of claim 5, the method further comprising:
    determining a new qualified name for the component of the IoT device based on a name associated with the new owner of the component of the IoT device.

8. The method of claim 5, the method further comprising:
    creating one or more change name ("CNAME") records in the DNS so as to redirect DNS lookups based on the name of a prior owner to the DNS entries for the new owner.

9. A non-transitory computer-readable storage medium containing instructions which, when executed on a processor, perform a method for establishing ownership of a component of an internet of things ("IoT") device, the method comprising:

receiving, at a registration service, a request to register the component of the IoT device, the request comprising a public key of the component of the IoT device, an identifier of the component of the IoT device, and a public key of an owner of the component of the IoT device;

generating, via the registration service, an authorization file that includes rights information associated with the component of the IoT device;

determining a qualified name for the component of the IoT device based on a name associated with the owner of the component of the IoT device;

generating one or more domain name system ("DNS") records for the component of the IoT device, the one or more DNS records comprising the authorization file and an authentication file that identifies a chain of ownership of the component of the IoT device; and storing the one or more DNS records in a registry.

10. The non-transitory computer-readable storage medium of claim 9, wherein the qualified name is a domain name based on the name of the owner.

11. The non-transitory computer-readable storage medium of claim 9, wherein the one or more DNS records comprises a DNS-Based Authentication of Named Entities ("DANE") record and attribute record (TXT) that describes the attributes of the component of the IoT device, wherein the DNS-Based DANE record comprises a TLSA record or SMIMEA record.

12. The non-transitory computer-readable storage medium of claim 9, wherein the one or more DNS records can be utilized to verify the authenticity of messages signed by the component of the IoT device.

13. The non-transitory computer-readable storage medium of claim 9, the method further comprising:

receiving, at the registration service, a request to transfer ownership of the component of the IoT device, wherein the request includes the ID of the device that is to be transferred, the name and public key of a new owner of the component of the IoT device and wherein the request is signed with the private key of the current owner of the component of the IoT device;

verifying the request with the public key of the current owner of the component of the IoT device; and updating the one or more DNS records to reflect the change in ownership of the owner to the new owner.

14. The non-transitory computer-readable storage medium of claim 13, wherein updating the one or more DNS records comprises updating the authentication file to associate the public key of the new owner with the component of the IoT device.

15. The non-transitory computer-readable storage medium of claim 13, the method further comprising:

determining a new qualified name for the component of the IoT device based on a name associated with the new owner of the component of the IoT device.

16. The non-transitory computer-readable storage medium of claim 13, the method further comprising:

creating one or more change name ("CNAME") records in the DNS so as to redirect DNS lookups based on the name of a prior owner to the DNS entries for the new owner.

17. A system comprising:

one or more processors; and memory storing instructions that, when executed by the one or more processors, perform a method for establishing ownership of a component of an internet of things ("IoT") device, the method comprising:

receiving, at a registration service, a request to register the component of the IoT device, the request comprising a public key of the component of the IoT device, an identifier of the component of the IoT device, and a public key of an owner of the component of the IoT device;

generating, via the registration service, an authorization file that includes rights information associated with the component of the IoT device;

determining a qualified name for the component of the IoT device based on a name associated with the owner of the component of the IoT device;

generating one or more domain name system ("DNS") records for the component of the IoT device, the one or more DNS records comprising the authorization file and an authentication file that identifies a chain of ownership of the component of the IoT device; and storing the one or more DNS records in a registry.

18. The system of claim 17, wherein the qualified name is a domain name based on the name of the owner.

19. The system of claim 17, wherein the one or more DNS records comprises a DNS-Based Authentication of Named Entities ("DANE") record and attribute record (TXT) that describes the attributes of the component of the IoT device, wherein the DNS-Based DANE record comprises a TLSA record or SMIMEA record.

20. The system of claim 17, wherein the one or more DNS records can be utilized to verify the authenticity of messages signed by the component of the IoT device.

21. The method of claim 1, further comprising generating, via the registration service, an attribute file that includes a model or a date of production associated with the component of the IoT device, wherein the one or more DNS records further comprises the attribute file.

* * * * *